United States Patent
Gaidon et al.

(10) Patent No.: US 9,697,439 B2
(45) Date of Patent: Jul. 4, 2017

(54) EFFICIENT OBJECT DETECTION WITH PATCH-LEVEL WINDOW PROCESSING

(71) Applicant: Xerox Corporation, Norwalk, CT (US)

(72) Inventors: Adrien Gaidon, Grenoble (FR); Diane Larlus-Larrondo, La Tronche (FR); Florent C. Perronnin, Domène (FR)

(73) Assignee: XEROX CORPORATION, Norwalk, CT (US)

( * ) Notice: Subject to any disclaimer, the term of this patent is extended or adjusted under 35 U.S.C. 154(b) by 203 days.

(21) Appl. No.: 14/505,031

(22) Filed: Oct. 2, 2014

(65) Prior Publication Data

US 2016/0098619 A1  Apr. 7, 2016

(51) Int. Cl.
 *G06K 9/62* (2006.01)
 *G06K 9/46* (2006.01)

(52) U.S. Cl.
 CPC ......... *G06K 9/6212* (2013.01); *G06K 9/4642* (2013.01); *G06K 9/6256* (2013.01)

(58) Field of Classification Search
 None
 See application file for complete search history.

(56) References Cited

U.S. PATENT DOCUMENTS

| | | |
|---|---|---|
| 8,532,399 B2 | 9/2013 | Perronnin et al. |
| 2003/0021481 A1 | 1/2003 | Kasutani |
| 2005/0223031 A1* | 10/2005 | Zisserman ........ G06F 17/30256 |
| 2007/0005356 A1 | 1/2007 | Perronnin et al. |
| 2007/0258648 A1 | 11/2007 | Perronnin |
| 2008/0069456 A1 | 3/2008 | Perronnin |
| 2008/0240572 A1 | 10/2008 | Hoshii |
| 2008/0317358 A1 | 12/2008 | Bressan et al. |
| 2009/0144033 A1 | 6/2009 | Liu et al. |
| 2009/0208118 A1 | 8/2009 | Csurka |
| 2010/0040285 A1* | 2/2010 | Csurka ............... G06K 9/00624 382/170 |
| 2010/0082615 A1 | 4/2010 | Clinchant et al. |
| 2010/0098343 A1 | 4/2010 | Perronnin et al. |
| 2010/0189354 A1 | 7/2010 | De Campos et al. |

(Continued)

OTHER PUBLICATIONS

Segmentation Driven Object Detection with Fisher Vectors. Ramazan Gokberk Cinbis Jakob Verbeek Cordelia Schmid. Nov. 2013.*
U.S. Appl. No. 14/141,612, filed Dec. 27, 2013, Naila Murray.
Chen, et al., "Efficient maximum appearance search for large-scale object detection," Proc. IEEE Conf. on Computer Vision and Pattern Recognition (CVPR13), pp. 3190-3197 (2013).
Cinbis, et al., "Segmentation Driven Object Detection with Fisher Vectors," IEEE Intern'l Conf. on Computer Vision, pp. 2968-2975 (2013).

(Continued)

*Primary Examiner* — Delomia L Gilliard
(74) *Attorney, Agent, or Firm* — Fay Sharpe LLP (57) ABSTRACT

An object detection method includes for each of a set of patches of an image, encoding features of the patch with a non-linear mapping function, and computing per-patch statistics based on the encoded features for approximating a window-level non-linear operation by a patch-level operation. Then, windows are extracted from the image, each window comprising a sub-set of the set of patches. Each of the windows is scored based on the computed patch statistics of the respective sub-set of patches. Objects, if any, can then be detected in the image, based on the window scores. The method and system allow the non-linear operations to be performed only at the patch level, reducing the computation time of the method, since there are generally many more windows than patches, while not impacting performance unduly, as compared to a system which performs non-linear operations at the window level.

21 Claims, 3 Drawing Sheets

(56) References Cited

U.S. PATENT DOCUMENTS

| | | |
|---|---|---|
| 2010/0191743 A1 | 7/2010 | Perronnin et al. |
| 2010/0226564 A1 | 9/2010 | Marchesotti et al. |
| 2010/0318477 A1 | 12/2010 | Perronnin et al. |
| 2011/0026831 A1 | 2/2011 | Perronnin et al. |
| 2011/0040711 A1 | 2/2011 | Perronnin et al. |
| 2011/0052063 A1 | 3/2011 | McAuley et al. |
| 2011/0072012 A1 | 3/2011 | Ah-Pine et al. |
| 2011/0091105 A1 | 4/2011 | Perronnin |
| 2011/0137898 A1 | 6/2011 | Gordo et al. |
| 2011/0184950 A1 | 7/2011 | Skaff et al. |
| 2012/0045134 A1 | 2/2012 | Perronnin et al. |
| 2012/0076401 A1* | 3/2012 | Sanchez .............. G06K 9/4676 382/159 |
| 2012/0143853 A1 | 6/2012 | Gordo et al. |
| 2012/0158739 A1 | 6/2012 | Ah-Pine et al. |
| 2012/0163715 A1 | 6/2012 | Murray et al. |
| 2013/0064444 A1 | 3/2013 | Gordo et al. |
| 2013/0159292 A1 | 6/2013 | Larlus et al. |
| 2013/0208977 A1* | 8/2013 | Jia ..................... G06K 9/6256 382/159 |
| 2013/0290222 A1 | 10/2013 | Gordo et al. |
| 2015/0104102 A1* | 4/2015 | Carreira .............. G06K 9/4676 382/195 |
| 2015/0186742 A1* | 7/2015 | Murray ................. G06K 9/629 382/190 |
| 2015/0248586 A1* | 9/2015 | Gaidon .............. G06K 9/00711 382/103 |

OTHER PUBLICATIONS

Dubout, et al., "Exact acceleration of linear object detectors," Proc. European Conf. on Computer Vision (ECCV), Lecture Notes in Computer Science, vol. 7574, pp. 301-311 (2012).

Everingham, et al., "The Pascal visual object classes challenge 2007 (VOC2007) Overview and results of detection challenge," pp. 1-17 (2007), downloaded at http://www.pascal-network.org/challenges/VOC/voc2007/workshop/index.html.

Lampert, et al., "Efficient subwindow search: A branch and bound framework for object localization," IEEE Trans. Pattern Anal. Mach. Intell., 31(12):2129-2142 (2009).

Li, et al., "Codemaps: segment, classify and search objects locally," IEEE Intern'l Conf. on Computer Vision, pp. 1-8 (2013).

Uijlings, et al., "Selective search for object recognition," Intern'l J. Computer Vision, vol. 104 (2), pp. 154-171 (2013).

Perronnin, et al., "Fisher kernels on visual vocabularies for image categorization," CVPR, pp. 1-8 (2007).

Sánchez, et al., "High-dimensional signature compression for largescale image classification," CVPR 2011, pp. 1665-1672 (2011).

Sánchez, et al., "Improving the fisher kernel for large scale image classification," Proc. 11$^{th}$ ECCV Part IV, pp. 143-156 (2010).

Sánchez, et al., "Image Classification with the Fisher Vector: Theory and Practice," INRIA Research Report No. 8209, pp. 1-40 (2013).

* cited by examiner

EFFICIENT OBJECT DETECTION WITH PATCH-LEVEL WINDOW PROCESSING

BACKGROUND

The exemplary embodiment relates to object detection and finds particular application in connection with a system and method for approximating window-level operations at the patch level for reducing computation time.

For many applications, the ability to detect and locate specific objects in images provides useful information. Given an image and a predefined set of semantic classes, e.g., "car" and "pedestrian," the goal is often to output all regions that contain instances of the considered class or classes. These image regions are most commonly predicted by rectangles referred to as bounding boxes or windows. The bounding boxes can vary in size and aspect ratio, depending on the anticipated size and shape of the object. Object detection is a challenging task, due in part to the variety of instances of objects of the same class, to the variety of imaging conditions (viewpoints, environments, lighting), and to the scale of the search space (typically millions of candidate regions for a single image).

Object detection finds application in transportation services, such as in locating license plates or vehicles in images captured by a toll-plaza or car park camera. In retail businesses, detecting and counting specific objects in store shelves would enable applications such as planogram compliance or out-of-stock detection. However, many existing object detection systems are not sufficiently accurate or efficient enough for practical application.

Existing object detection algorithms cast detection as a binary classification problem: given a candidate window and a candidate class, the goal is to determine whether the window contains an object of the considered class, or not. This generally includes computing a feature vector describing the window and classifying the feature vector with a binary classifier, e.g., a linear SVM. A sliding window may be used to scan a large set of possible candidate windows. In this approach, a window is moved stepwise across the image in fixed increments so that a decision is computed for multiple overlapping windows. In practice, this approach uses windows of different sizes and aspect ratios to detect objects at multiple scales, with different shapes, and from different viewpoints. Consequently, millions of windows are tested per image. Building window-level feature vectors generally involves the aggregation of patch descriptors for a set of patches constituting the window and applying costly non-linearities to the aggregated vectors. The computational cost is, therefore, one of the major impediments to practical implementation.

Extracting patch-based features from the candidate windows is described, for example, in Cinbis, et al., "Segmentation Driven Object Detection with Fisher Vectors," IEEE Intern'l Conf. on Computer Vision, pp. 2968-2975 (2013), and is one of the most successful approaches to detection. The method generally includes extracting a set of patches from the candidate window, typically on a dense multi-scale grid (the number of patches depends on the window size), computing one low-level (patch) descriptor per patch, encoding each patch descriptor using a non-linear mapping function that embeds the low-dimensional patch descriptors into a higher-dimensional space, aggregating these patch encodings using a pooling function, typically by summing the patch encodings, applying a set of normalization steps to the pooled representation, such as a power transformation or $l_2$-normalization, and classifying the resulting window representation, for example with a linear classifier. As the non-linear mapping function, a Fisher Vector encoding function may be used.

Since the same patch may appear in many candidate windows, some of the patch-level computation may be re-used for different windows, thereby reducing computational cost. Accordingly, the first steps in the method may include computing a patch descriptor for each patch in the image, encoding the patch descriptor, and storing the encoding. Then for each window, the encodings for the patches it contains are retrieved and then pooled and normalized, as described above.

Unfortunately, even when precomputing the patch-level encodings, the cost of the detection procedure remains prohibitive for many practical applications. For example, it may take up to several minutes per image and per candidate class, due to the window-level operations. Solutions to mitigate this problem have been proposed. However, such methods tend to have drawbacks, such as compromising the classification accuracy, requiring unrealistic assumptions to be made (e.g., a maximum of one object per image), or only marginally reducing the computational cost. For example, in one method, the patches are individually scored prior to aggregation at the window level, ignoring the costly normalization step. See, for example, Chen, et al., "Efficient maximum appearance search for large-scale object detection," Proc. IEEE Conf. on Computer Vision and Pattern Recognition (CVPR13), pp. 3190-3197 (2013). While reducing cost, this comes at the expense of a significant loss in performance.

There remains a need for a system and method for object detection which reduces computational cost without significantly reducing detection performance.

INCORPORATION BY REFERENCE

The following references, the disclosures of which are incorporated by reference in their entireties, are mentioned:

U.S. application Ser. No. 14/141,612, filed Dec. 27, 2013, entitled WEIGHTING SCHEME FOR POOLING IMAGE DESCRIPTORS, by Naila Murray, et al.

The following relate generally to object classification: U.S. Pub. Nos. 20070005356, 20070258648, 20080069456, 20090144033, 20100092084, 20100098343, 20100189354, 20100191743, 20100318477, 20110026831, 20110040711, 20110091105, 20110137898, 20120045134, 20120076401, 20120143853, 20130064444, and 20130290222.

BRIEF DESCRIPTION

In accordance with one aspect of the exemplary embodiment, an object detection method includes for each of a set of patches, encoding features of each of the patches with a non-linear mapping function. Patch statistics are computed on the encoded patch features for approximating a window-level non-linear operation with a set of patch-level operations. Windows are extracted from the image, each window comprising a sub-set of the set of patches. Each of the windows is scored based on the computed patch statistics of the respective sub-set of patches. Provision is made for detecting objects in the image based on the window scores.

At least one of the encoding patch features, computing patch statistics, extracting windows, scoring the windows, and detection of objects may be performed with a processor.

In accordance with another aspect of the exemplary embodiment, an object detection system includes a patch descriptor generator which computes patch descriptors for a set of patches of an input image and a patch embedding component encodes each of the patch descriptors with a non-linear mapping function to generate encoded patch features. Alternatively, a direct component, for each of a set of patches, encodes features of the patch directly with a non-linear mapping function to generate encoded patch features. A patch statistics computing component computes patch statistics on the encoded patch features for approximating a window-level non-linear operation with a set of patch-level operations. A window extractor extracts windows from the image. Each window includes a sub-set of the set of patches. A window scoring component scores the windows based on the computed patch statistics of the respective sub-set of patches. A detection component detects objects in the image based on the window scores. A processor implements the patch descriptor generator, patch embedding component, patch statistics computing component, window extractor, window scoring component, and detection component.

In accordance with another aspect of the exemplary embodiment, an object detection method includes encoding features of each of the patches with a non-linear mapping function that is based on a generative model. Patch statistics are computed on the encoded patch features for approximating a window-level non-linear operation with a set of patch-level operations. The computing of the patch statistics includes computing a non-linear function of the encoded patch descriptor and a weighted function of the encoded patch descriptor using weights of a linear classifier trained to score window representations. Windows are extracted from the image, each window including a sub-set of the set of patches. Each of the windows is scored, based on the computed patch statistics of the respective sub-set of patches. Provision is made for detecting objects in the image based on the window scores.

At least one of the encoding patch features, computing patch statistics, extracting windows, scoring the windows, and detection of objects may be performed with a processor.

DETAILED DESCRIPTION

The exemplary embodiment provides a system and method for classifying candidate windows of an image based on extracted patch-based features. The exemplary system and method provide an efficient approach to patch-based sliding-window object detection by approximating a window-level non-linear normalization operation with a set of patch-level operations. In some embodiments, integral images or box filters are used for the fast pooling operation. In some embodiments, Fisher Vectors are used for encoding patch descriptors. The method can be extended to spatial pyramids and other methods in which windows are subdivided into sub-windows to be separately represented before the window as whole is classified.

The exemplary method approximates some of the window-level computations in order to recast them into patch-level operations. The method can reduce the computational cost for a large family of patch-based detection systems.

Patch-based representations perform well in practice. For example, Cinbis, et al. reports good results using a Fisher Vector encoding function cp. Furthermore, this family of methods offers opportunities for reducing the computational cost. In practice, an image indeed contains at least two orders of magnitude less patches than windows. Consequently, the same patch may appear in many candidate windows. Some of the patch-level computation may therefore be re-used for different windows. Therefore, in conventional methods, patch-based detection can be split in two stages:

Stage 1: For each patch $\pi_k$ in an image:
(a) extract a descriptor $x_k$ (step 1);
(b) encode the descriptor as $\phi(x_k)$ (step 2).

Stage 2: For a candidate window with patches $\{\phi(x_k), k=1, \ldots, K\}$:
(a) pool the patch encodings: $z=h(\{\phi(x_k), k=1, \ldots, K\})$ (step 3);
(b) apply a window-specific normalization $g(z)$ (step 4);
(c) classify the final window representation using $f(g(z))$ (step 5).

However, the non-linear window-specific normalization in step 4 is a computationally expensive operation. The present method reduces computational cost by approximating the window-level non-linear normalization operation by a patch-level operation prior to step 3, i.e., can be performed on all patches of the image that may be found in any of the windows.

Figure 1:
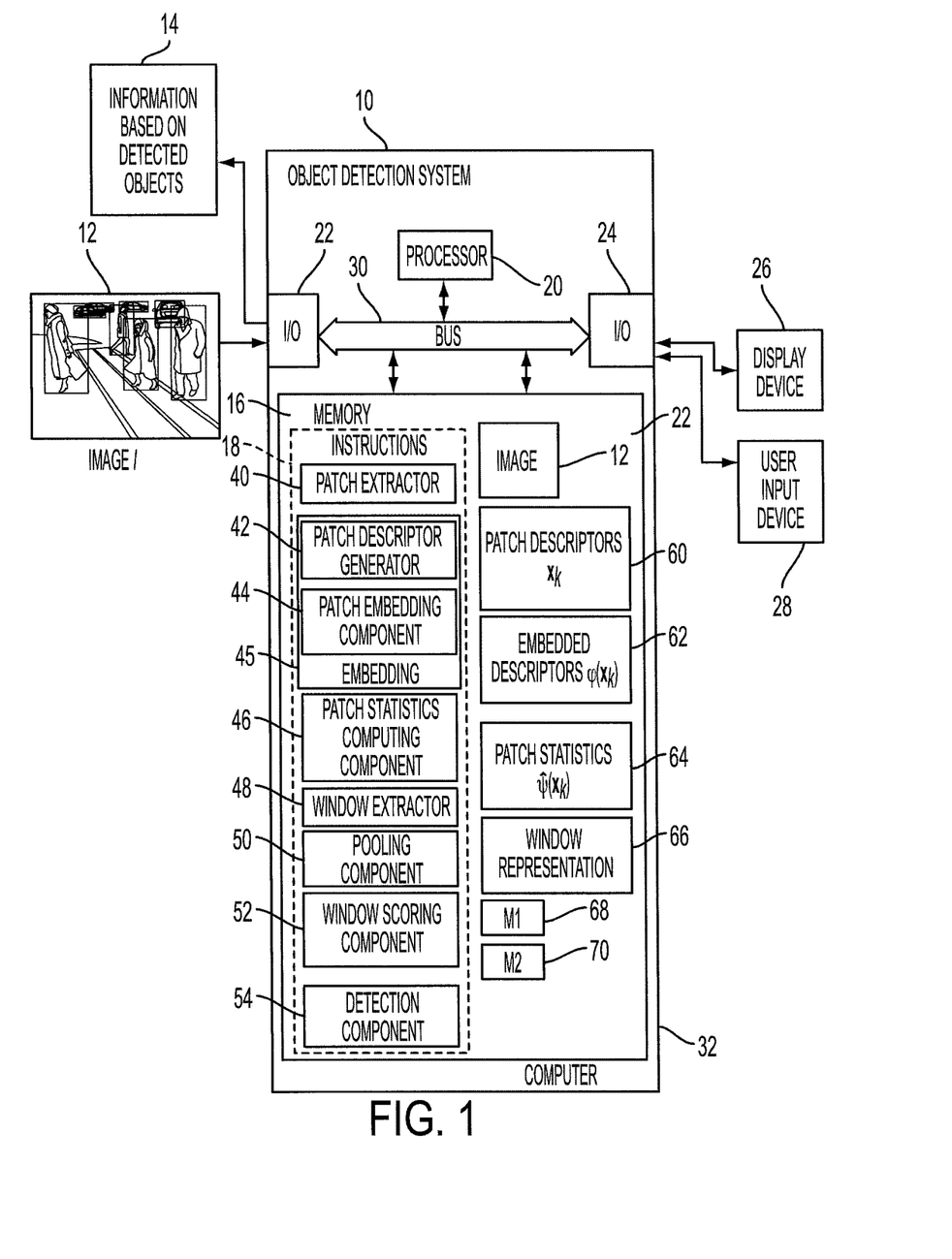
FIG. 1 is a functional block diagram of a system for classifying candidate windows for in accordance with one aspect of the exemplary embodiment; a FIG. 2 is a flow chart illustrating a method for in accordance with another aspect of the exemplary embodiment.

With reference to FIG. 1, a computer-implemented object detection system 10 for detection of visual objects in a given class or classes in an input image 12, such as a photographic image, is illustrated. The system takes as input an image 12 which potentially includes a visual object in a predefined semantic class, such a "person," "car," or the like. The system outputs information 14 based on the detection of objects, where present, in the predefined classes.

The illustrated system includes memory 16 which stores instructions 18 for performing the method and a processor 20, in communication with the memory, for executing the instructions. Memory 16 stores the input image 12 during processing as well as information generated during the processing of the image. One or more network interface (I/O) devices 22, 24 allow the system to communicate with external devices, such as a source of the image (not shown), a display device 26, such as a computer monitor or LCD screen, and a user input device 38, such as a keyboard, keypad, touch screen cursor control device, or combination thereof. Hardware components 16, 20, 22, 24 of the system may be communicatively connected by a data/control bus 30. The system may be hosted by one or more computing devices 32.

The illustrated instructions include a patch extractor 40, a patch descriptor extractor 42, a patch embedding component 44, a patch statistics computing component 46, a window extractor 48, a pooling component 50, a scoring component 52, and a decision/output component 54.

Briefly, the patch extractor 40 extracts a set of patches 56 (FIG. 2) from the image 12, each patch comprising an array of pixels. The patches may be extracted uniformly, on a grid so that the entire image or a substantial portion thereof is covered by patches. In general each patch 56 is smaller is size than the smallest window 58 to be subsequently extracted such that each window includes a plurality of patches.

The descriptor generator 42 generates a patch descriptor $x_k$ 60 based on the pixels of the respective patch. The embedding component 44 embeds the patch descriptor into an embedding space using an embedding function $\phi$, to generate an embedded descriptor $\phi(x_k)$ 62 for each patch. In the case of BOV, the embedding function may include assigning the patch descriptor to the closest visual word in a set of visual words (or codebook), where each of the visual words represents a centroid of a cluster of patch descriptors extracted from a set of training images. In other embodiments, components 42 and 44 can be replaced with a direct embedding component 45, which for each of the set of patches, directly encodes the extracted features of each of the patches with a non-linear mapping function to form encoded patch features, without the need for generating a patch descriptor.

The patch statistics computing component 46 generates per-patch statistics $\hat{\psi}(x_k) = (w^T \phi(x_k), \|\phi(x_k)\|_2^2)$ 64 for each of the patches, based on the embedded descriptors. In particular, the component 46 approximates a window-level non-linear normalization operation by a patch-level normalization operation and scores each of the patches in the image using weights of the one or more classifier models 68, 70.

The window extractor 48 generates a set of windows 58, each less than the size of the image and each including a sub-set (fewer than all) of the patches 56. Each window has a width w which is less than a width W of the image and a height h, which is less than a height H of the image. The windows may be extracted by sliding a window template across the image stepwise, in horizontal and vertical steps. There may be a predefined set of window templates of different heights H and widths W.

The pooling component 50 aggregates the patch statistics 64 over all the patches in a given window to form an aggregation $\Sigma_{i=1}^{K} w^T \phi(x_i)$ and an aggregation $\Sigma_{i=1}^{K} \|\phi(x_i)\|_2^2$ which can serve as a representation 66 of a window for a given class corresponding to the vector of weights w.

The scoring component 52 scores the window for assigning a probability to a window of being in a given class (or classes), based on the window representation 66. In some embodiments, the pooling and scoring are performed in a single operation based on the previously-computed patch statistics.

The detection component 54 identifies objects in each class corresponding to the windows for which the score output by the scoring component at least meets a threshold value. The detection component may output a decision based on the score, which may be a binary decision. The detection component outputs information 14 based on the computed decision, such as the locations of detected objects in the image, a classification for the image based on whether or not an object in the given class is present, or the like.

The computer system 10 may include one or more computing devices, such as a desktop, a laptop, palmtop computer, portable digital assistant (PDA), server computer, cellular telephone, tablet computer, pager, combination thereof, or other computing device capable of executing instructions for performing the exemplary method.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of random access memory and read only memory. In some embodiments, the processor 20 and memory 16 may be combined in a single chip. Memory 16 stores instructions for performing the exemplary method as well as the processed data 60, 62, 64, 66, etc.

The network interface 22, 24 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 32, executes the instructions 18 stored in memory 16 for performing the method outlined in FIG. 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
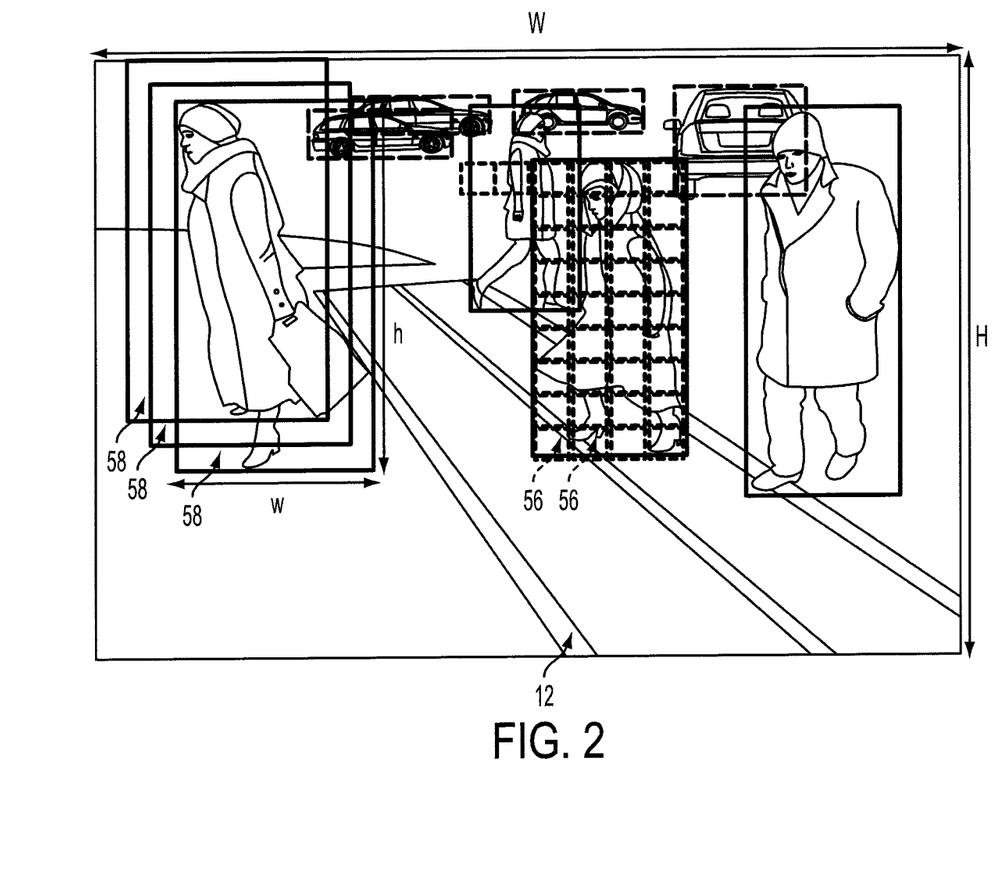

FIG. 2 illustrates a method for detection of objects in images. The method begins at S100.

At S102, an input image 12 is received by the system 10, either from an external device, or from internal memory of the computing device 32.

At S104, multiple patches 56 are extracted from the image by the patch extractor 40.

At S106, a patch descriptor $x_k$ is extracted from each patch 56 by the descriptor generator 42, e., based on low level features, such as color, gradient, or combination thereof.

At S108, each patch descriptor $x_k$ is embedded using a non-linear embedding function $\phi$ to form an embedded patch descriptor $\phi(x_k)$. In some embodiments, rather than performing S106 and S108 as two separate steps, the steps can be combined such that, for each of a set of patches, the features of each of the patches are encoded with a non-linear mapping function.

At S110, patch statistics are computed. These may include, for each patch, computing a first scalar statistic, which reflects a contribution of the patch to the score of the window, such as a patch score computed using weights of the classifier model 68 or 70, and computing a second scalar statistic, which approximates the normalization of the window at the patch level, such as computing a non-linear function of the patch embedding $\phi(x_k)$, such as its norm, which normalizes the encoded patch descriptor. Several different object classifier models may be applied, one for each of a set of object classes.

The non-linear computations in the patch statistics computed at the patch level allow approximation of a window-level non-linear normalization operation with patch-level operations.

At S112, windows 58 are extracted from the image, which includes identifying, for each window a subset of the patches. Windows may be extracted by sliding a bounding box of a selected size and aspect ratio in small increments of a few pixels across the image and repeating the process with different sizes/aspect ratios previously selected as being appropriate for a given class.

At S114, patch statistics $\hat{\psi}(x_k)$ of each of the patches 56 within a given window 58 are aggregated to form a window representation 66 and at S116 the window representation is scored using a scoring function for a given class. Since the per-patch statistics computed and stored at S110 are simply two scalar values, the aggregating and scoring is computationally inexpensive. Steps S114 and S116 can be performed as a single step with a single scoring function which combines the aggregation and scoring. In embodiments using spatial pyramids, several sub-windows can be generated for a given window and an aggregating function is used for each sub-window. The sub-window representations thus formed can be concatenated or otherwise combined to form a window representation 66.

Several different object classifier models may be applied to the window, one for each of a set of object classes. In some embodiments, the pooling and scoring are combined into a single operation.

At S118, a decision is made based on the classification regarding whether the window includes an object in the given class.

At S120, information 14 is output, based on the decision, such as the set of windows that meet a threshold score for a given class, for each of one or more classes. The method ends at S122.

Figure 3:
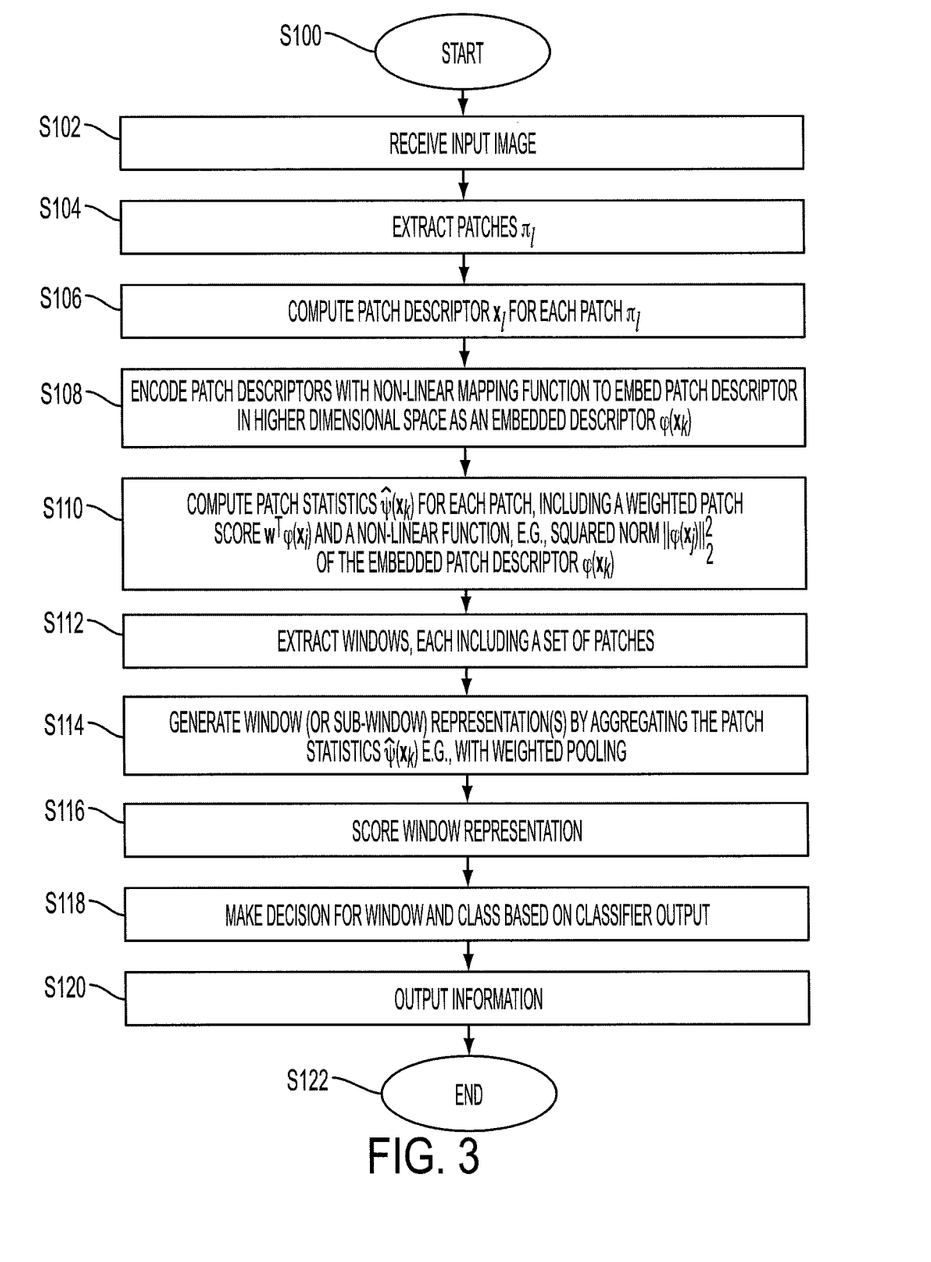
FIG. 3 illustrates windows of different sizes extracted from an image.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 32, (for example, an internal hard drive of RAM), or may be separate (for example, an external hard drive operatively connected with the computer 32), or may be separate and accessed via a digital data network such as a local area network (LAN) or the Internet (for example, as a redundant array of inexpensive of independent disks (RAID) or other network server storage that is indirectly accessed by the computer 32, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details on the method and system are now described using the following notation:

Let $\mathcal{I} = \{x_l, l=1, \ldots, L\}$ represent an image composed of a set of L patches $\pi_l$ that are represented by respective patch descriptors $x_l \in \mathbb{R}^{d'}$, such as vectors, where $\mathbb{R}^{d'}$ represents the space of patch descriptors of dimensionality d'. For each patch, the descriptor is encoded using a non-linear mapping function $\phi: x_l \mapsto \phi(x_l)$ that embeds the low-dimensional descriptors $x_l$ into a higher-dimensional space to generate patch encodings $\phi(x_l) \in \mathbb{R}^d$. In the exemplary embodiment, the dimensionality of the patch encodings, d>>d', e.g., d'≈1e2, d≈1e5.

Let $\chi \subset \mathcal{I}$ be an arbitrary candidate window containing a subset K≤L of patch descriptors. Let $\phi(\chi) = \{\phi(x_k), k=1, \ldots, K\}$ represent the set of high-dimensional patch encodings $\phi(x_k) \in \mathbb{R}^d$ of window $\chi$.

Conventional Method

An existing method of generating a window will be briefly described, which gives an example of what the exemplary method attempts to approximate.

1. extract a set of patches $\pi_k$ from the image, typically on a dense multi-scale grid (the number of patches depends on the window size) (as for S102);

2. compute one low-level descriptor $x_k$ per patch $\pi_k$ (as for S104);

3. encode each descriptor using a non-linear mapping function $\phi: x_k \mapsto \phi(x_k)$ that embeds the low-dimensional descriptors into a higher-dimensional space (typically $x_k \in \mathbb{R}^{d'}$ and $\phi(x_k) \in \mathbb{R}^d$, d>>d', e.g., d'≈1e2, d≈1e5) (as for S106);

4. aggregate the patch encodings $\phi(x_k)$ using a pooling function h, typically by summing:

$$z = h(\{\phi(x_k), k=1, \ldots, K\}) = \Sigma_{k=1}^{K} \phi(x_k); \quad (1)$$

5. apply a set of normalization steps to the pooled representation, $g: z \mapsto g(z)$, e.g.:

1) a power transformation: $z \mapsto \text{sign}(z)|z|^\alpha$ where the sign and power operations should be understood as term-by-term operations, or 2) an $l_2$-normalization: $z \mapsto z/\|z\|_2$;

6. classify the window representation, e.g., by using efficient linear classifiers of the form $f(g(z)) = w^T g(z) + b$, where w represents a vector of classifier weights, one weight per dimension of the pooled representation g(z), T represents the transpose operator, and b represents an optional offset.

The classification score $s(\chi)$ of the window can be represented as:

$$s(\chi) = f \cdot g \cdot h \cdot \phi(\chi) = w^T g(h(\phi(\chi))) + b \quad (2)$$

where: h represents the pooling function, g represents the normalization operation, f represents the linear classifier and b represents the offset parameter of the classifier.

Approximation Method

The goal of the present method is to compute the window-level score $s(\chi)$ efficiently (through an approximation) over a large set of windows $\{\chi_n, n=1, \ldots, N\}$, where the N windows are obtained by a sliding window procedure. In the exemplary embodiment, N>>L, and many windows overlap with each other, thus sharing many patches. Efficiently leveraging that structure depends on the properties of the window score function $s(\chi)$.

The computational bottleneck in Eq. (2) lies in the window-level operations f, g, and h, which operate jointly on all the patches of a window $\chi$, and, therefore, are performed N times (once per candidate window). In contrast, the embedding $\phi$ can be applied independently on each patch, and is, therefore, performed only L<<N times, which is independent of the number of candidate windows N. One way to leverage this structure could include computing a score where the pooling and the other window-level operations are swapped:

$$\tilde{s}(\chi) = h \cdot f \cdot g \cdot \phi(\chi) \quad (3)$$

where the application of f, g, and $\phi$ is patch-wise. This yields an efficient implementation where a single expensive operation $\psi = f \cdot g \cdot \phi$ is applied for each of the L patches of image $\mathcal{I}$ in a first stage, followed by a single inexpensive pooling step h for each of the N candidate windows in a second stage. In practice, however, $\tilde{s}(\chi) \neq s(\chi)$ due to the fact that g and h do not commute in general, i.e., $g(h(\phi(\chi))) \neq h(g(\phi(\chi)))$.

To address this, g can be approximated with a function $\hat{g}$ that i) commutes with h and ii) yields an efficient scoring function $\hat{s} = h \cdot f \cdot \hat{g} \cdot \phi$ that is close to the exact but expensive scoring function $s = f \cdot g \cdot h \cdot \phi$. The approximation $\hat{g}$ is specific to the function g, and also depends on the choice of the pooling function h. One approach will now be described.

1. Approximating the Window Descriptor Using Patch-Level Statistics

In general, the patches are represented by a respective embedded descriptor $\phi(x_k) \in \mathbb{R}^d$. The embedding can use any suitable non-linear embedding function, such as a Bag-of-Words model, Fisher Vectors, and those using deep learning techniques. In those cases, linear classifiers f make use of an $l_2$-normalization step in order to reach performance: $g: z \mapsto z/\|z\|_2$, where $z = h(\phi(\chi))$. (see, Cinbis, et al).

While other normalization functions g exist (e.g., square-rooting), their benefits in practice are less significant, or specific to the particular embedding $\phi$ chosen (Cinbis, et al.). In the following, therefore, the $l_2$-normalization operation is considered as the non-linear operation to be approximated at the patch level.

The $l_2$-normalization is not additive with respect to patches. Therefore, g does not commute with h, which in the standard setting is generally a linear pooling function.

In the example embodiment, h is the aggregation function which takes a set of vectors (patch embeddings) and aggregates it to form a single vector. h can be a simple sum pooling, i.e., $h(\phi(\chi)) = \sum_{k=1}^{K} \phi(x_k)$ without loss of generality with respect to the linear case. In one embodiment, the $l_2$-norm of a window is approximated using the individual $l_2$-norms of its patches (operations on sets are meant element-wise):

$$\|z\|_2^2 = \|h(\phi(\chi))\|_2^2 \approx h(\|\phi(\chi)\|_2^2) \quad (4)$$

In the exemplary embodiment, this corresponds to the following:

$$\|\Sigma_{k=1}^{K} \phi(x_k)\|_2^2 \approx \Sigma_{k=1}^{K} \|\phi(x_k)\|_2^2 \quad (5)$$

In Eq. (5), the norm of the sum of the patch encodings is approximated as the sum of the norms of the patch encodings. This approximation, therefore, disregards the sum of the cross-products between patch embeddings, i.e., it assumes:

$$\Sigma_{i=1}^{K} \Sigma_{j \neq i} \phi(x_i)^T \phi(x_j) \approx 0 \quad (6)$$

Where i and j are indices of x. In practice, this orthogonality assumption on the patch embeddings is reasonable for many windows, as:

1. patch embeddings are very high dimensional, and, thus, have low similarities a priori (curse of dimensionality);

2. patches are sampled on a coarse grid for efficiency reasons (limited overlap); and 3. rich visual scenes are characterized by many different patches.

It is to be noted, however, that this orthogonality assumption may not hold for windows with low visual diversity, for example, windows with a high density of patches (big overlap), for very small windows, and for windows with poor visual content, e.g., uniformly textured regions like forests, or sky.

Using this approximation, the following patch-level operation is performed (S110, Stage 1), prior to any window-level pooling (S114, Stage 2):

$$\hat{\psi}(x_k) = f \cdot \hat{g} \cdot \phi(x_k) = (w^T \phi(x_k), \|\phi(x_k)\|_2^2) \quad (7)$$

i.e., each patch is represented at S110 by a weighted function of the patch embedding $(w^T \phi(x_k))$. $\hat{g}$ is the normalization function that takes a vector $\phi(x_k)$ and outputs a normalized vector, here the squared $l_2$-norm of the patch embedding denoted $\|\phi(x_k)\|_2^2$. w is the vector of weights for the classifier function f. This operation corresponds to maintaining separate score and normalization information of the patch embeddings of the whole image. Note that the offset b of the linear classifier f is omitted. Each ∘ denotes that $\hat{\psi}(x_k)$ is a composition of f, $\hat{g}$, and $\phi(x_k)$.

These patch-level statistics $\hat{\psi}(x_k)$ can be efficiently pre-computed for each patch over the image $\mathcal{I} = \{x_l, l=1, \ldots, L\}$ and stored in memory. For example, stacking the patch embeddings into a matrix A, where the l-th row of A is $\phi(x_l)$, allows efficient vectorized operations (e.g., SSE instructions) to be used to compute the squared $l_2$-norms of the rows of A, while optimized linear algebra packages (e.g., LAPACK) allow the per-patch scores to be computed with a single matrix-vector multiplication Aw. It may be noted also that these patch statistics $\hat{\psi}(x_k)$ represent only two floating point numbers per patch, and are therefore very cheap to store.

2. Efficient Pooling of Patch-Level Statistics (S114)

To compute the approximate score $\hat{s}(\chi)$ of window $\chi$ by pooling the previously defined precomputed patch statistics, a modified pooling function h can be used:

$$\hat{s}(X) = h(\hat{\psi}(X)) = \frac{\sum_{i=1}^{K} w^T \varphi(x_i)}{\sqrt{\sum_{i=1}^{K} \|\varphi(x_i)\|_2^2}} + b \quad (8)$$

where b is an offset parameter which can be fixed or ignored (included in the scoring threshold).

The exemplary pooling function thus offers a way to avoid all non-linear operations at the window stage, since the two summations in Eq. (8) are of previously computed components, the one in the numerator is a scalar product (dot product of $w^T$ and $\phi(x_i)$), while the sum in the denominator is a single value, i.e., a sum of the squared $l_2$-norms computed at the patch-level for each of the patches in the window.

For many applications, the two summations which are computed over the patch statistics (numerator and denominator in Eq. (8)) need to be computed even more efficiently, due to the vast number of candidate windows N in an image. Two methods are given by way of example. The first is applicable when the candidate windows have many different sizes. The second is more efficient when there only few unique window sizes.

A. Integral images

The first technique relies on integral images (also known as summed area tables). In the integral image method, a data structure H is generated that, for any location (x, y) in image $\mathcal{I}$, stores the cumulative sums of all the patch statistics $\hat{\psi}(x)$ for all the patches x above and to the left of (x, y):

$$H(x,y) = \sum_{x \in \mathcal{I}(x,y)} \hat{\psi}(x), \quad (9)$$

where $\mathcal{I}(x, y)$ is the restriction of $\mathcal{I}$ to the set of patches above and to the left of (x, y). The integral image is precomputed only once per image $\mathcal{I}$ (one integral image is computed per type of patch statistics). This operation is linear in the number of patches L in $\mathcal{I}$, independently of the number of candidate windows N>>L. Then, the score $\hat{s}(\chi)$ can be computed for any window $\chi$ in constant time with only four look-up operations on the integral image H:

$$\hat{s}(\chi) = \tilde{g}(H(x_0,y_0) + H(x_1,y_1) - H(x_0,y_1) - H(x_1,y_0)) + b, \quad (10)$$

where $\tilde{g}(u, v) = u/\sqrt{v}$, and $(x_0, y_0)$ (resp. $(x_1, y_1)$) are the coordinates of the upper left (resp. lower right) corner of window $\chi$ (the origin (0,0) of the image $\mathcal{I}$ being its upper left corner by convention). u and v represent the input variables to the function $\tilde{g}$. In the present case, these are two scalar arguments and thus the output $u/\sqrt{v}$ is a scalar quantity.

Consequently, this algorithm is very efficient when the detection procedure involves candidate windows with arbitrary or many different sizes.

B. Box Filters

The second technique is specifically tailored to another standard detection setting: when using only few different candidate window sizes, either for efficiency reasons, or when the size of the objects of interest is known to have limited variations (for example, when doing tracking by detection). This method relies on a signal processing view of Eq. (8). The spatial structure of the patch statistics over the whole image $\hat{\psi}(\mathcal{I})$ can be used to view the summations in Eq. (8) as the result of convolutions with filters F of the form:

$$F = \begin{bmatrix} 1 & \cdots & 1 \\ & \cdots & \\ 1 & \cdots & 1 \end{bmatrix} \quad (11)$$

This particular type of filter is called a box filter. Its main advantage is that it can be implemented with hardware-optimized operations on a central processing unit (CPU) or graphics processing unit (GPU). These operations are, in practice, much more efficient than standard generic convolution implementations (including those that leverage the convolution theorem with the FFT). The filter size depends on the candidate window size which is to be scanned across the image, so the filtering is performed once for every candidate size of interest. However, this filtering process does not depend on a step size for the sliding window search. Consequently, it allows for an exhaustive search to be performed across locations at no extra cost.

In summary, the method can efficiently compute the scores $\hat{s}(\{\chi_n, n=1, \ldots, N\})$ (e.g., as a probability map) of all possible windows $\chi_n$ of size w×h in image $\mathcal{I}$ using the w×h box filter F:

$$\hat{s}(\{\chi_n, n=1, \ldots, N\}) = \tilde{g}(F * \hat{\psi}(\mathcal{I})) + b. \quad (12)$$

3. Extension of the Approximation Method to Spatial Pyramids

Spatial pyramids form a useful extension of the detection methods described herein. This approach includes incorporating global geometrical information by dividing a window in different sub-windows, called cells, and performing the pooling and normalization operations per cell, before concatenating the per-cell descriptors into a single structured window-level descriptor. The exemplary method can be readily extended to that setting by treating cells as independent windows. First, cell-specific patch-level statistics are computed, i.e., Eq. 7 is replaced with:

$$\hat{\psi}_{SP}(x_k) = (w_1^T \phi(x_k), \ldots, w_C^T \phi(x_k), \|\phi(x_k)\|_2^2), \quad (13)$$

where $w_c$ represents the part of the weight vector w (of the linear classifier f) corresponding to the spatial pyramid cell c, c=1, ..., C. When a window is selected, the cell in which each patch is located is determined so that the appropriate one of the scalar values $w_1^T \phi(x_k)$, etc., is used for that patch. Second, a simple sum over cells is added to the pooling step in Eq. (8):

$$\hat{s}_{SP}(X) = h_{SP}(\hat{\psi}_{SP}(X)) = \sum_{c=1}^{C} \frac{\sum_{i \in \mathcal{J}_c(X)} w_c^T \varphi(x_i)}{\sqrt{\sum_{j \in \mathcal{J}_c(X)} \|\varphi(x_j)\|_2^2}} + b, \quad (14)$$

where $\mathcal{J}_c(\chi)$ is the set of indices of patches belonging to cell c of window $\chi$. The other aspects of the method pertaining to the case without spatial pyramid can also be incorporated.

Patch Extraction (S104)

The patch extractor 40 extracts and analyzes low level visual features of patches of the image 12, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. For example, at least 10 or at least 20 or at least 50, or at least 200, or at least 500, or at least 1000 patches are extracted from each image. Each patch may comprise at least 40 or at least 100 pixels, and up to 1,000,000 pixels or more.

Computing Patch Descriptors (S106)

The patch descriptor extractor 60 extracts a set of low level features in the form of a patch descriptor, such as a vector or histogram, from each patch. For example, as patch descriptors extracted from the patches, SIFT descriptors or other intensity gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA).

Embedding (S108)

As noted above, the method is applicable to a variety of embedding techniques. Examples include:

1. The Bag of Visual Words (BOV)

In this method, the patch descriptors of the patches of an image are assigned to clusters. For example, a visual vocabulary is previously obtained by clustering patch descriptors extracted from training images, using for instance K-means clustering analysis. Each patch vector is then assigned to a nearest cluster (visual word) in the previously trained vocabulary and a histogram of the assignments can be generated by accumulating the occurrences of each visual word.

For further details on the BOV embedding method, see U.S. Pub. Nos. 20070005356, 20070258648, and 20080069456, and Gabriela Csurka, et al., "Visual Categorization with Bags of Keypoints," European Conf. on Computer Vision (ECCV) Workshop on Statistical Learning in Computer Vision (2004), the disclosures of which are incorporated herein by reference in their entireties.

2. The Fisher Vector (FV)

When the Fisher Vector (FV) is used for embedding it is assumed that a generative model of patches exists (such as a Gaussian Mixture Model (GMM)) from which all the patch descriptors are emitted, and the Fisher Vector components are the gradient of the log-likelihood of the descriptor with respect to the parameters of the model. The exemplary mixture model is a Gaussian mixture model (GMM) comprising a set of Gaussian functions (Gaussians) to which weights are assigned in the parameter training. Each Gaussian is represented by its mean vector and covariance matrix. It can be assumed that the covariance matrices are diagonal. See, e.g., Perronnin, et al., "Fisher kernels on visual vocabularies for image categorization," CVPR (2007).

Each patch used for training can thus be characterized by a vector of weights, one weight for each of the Gaussian functions forming the mixture model. In this case, the visual vocabulary can be estimated using the Expectation-Maximization (EM) algorithm. The trained GMM is intended to describe the content of any image within a range of interest.

Methods for computing Fisher Vectors are more fully described in U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sánchez, et al., U.S. Pub. No. 20120045134, published Feb. 23, 2012, entitled LARGE SCALE IMAGE CLASSIFICATION, by Florent Perronnin, et al., Jorge Sánchez, et al., "High-dimensional signature compression for large-scale image classification," in CVPR 2011, Jorge Sánchez and Thomas Mensink, "Improving the fisher kernel for large-scale image classification," Proc. 11$^{th}$ European Conference on Computer Vision (ECCV): Part IV, pp. 143-156 (2010), Jorge Sánchez, et al., "Image Classification with the Fisher Vector: Theory and Practice," INRIA Research Report No. 8209 (May 2013), the disclosures of which are incorporated herein by reference in their entireties.

Scoring

An exemplary window scoring component 52 uses the weights of a linear classifier model 68, 70. Based on the computed score, the window is assigned to a respective class, or not (a binary decision), or is assigned a probability of being in the class. The exemplary classifier is of the form: $f(g(z))=w^T g(z)+b$, as discussed above.

The scoring function can be as described in Eq. (8), (10), (12), or (14).

The classifier may be trained by a method which includes, for each of a set of training images, generating window representations 66 according to the method outlined in S104-S114. The window representations are manually labeled as to whether they include an object in the given class or not. The classifier model 68, 70 is learned on the window representations and their respective labels. Any suitable classifier learning method may be employed which is suited to learning linear classifiers, such as Logistic Regression, Sparse Linear Regression, Sparse Multinomial Logistic Regression, support vector machines, or the like. The exemplary classifier is a binary classifier, although multiclass classifiers are also contemplated. The output of a set of binary classifiers may be combined to assign the window to one of a number of classes, or probabilistically over all classes.

While a liner classifier is used in the example embodiment, in other embodiments, a non-linear classifier may be learned.

Further details on classification methods are provided in U.S. Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853; 20120158739 20120163715, and 20130159292, the disclosures of which are incorporated herein by reference in their entireties.

Without intending to limit the scope of the exemplary embodiment, the following examples demonstrate the applicability of the method to various classification tasks.

EXAMPLES

To experimentally validate the method, the methodology of Cinbis, et al. was followed as a baseline. A subset of the PASCAL VOC 2007 dataset (see, Everingham, et al., "The PASCAL visual object classes challenge 2007 (VOC2007)," http://www.pascal-network.org/challenges/VOC/voc2007/workshop/index.html], consisting of 425 training and 435 testing images, and four object categories of interest: Bus, Cat, Motorbike, and Sheep, was used for the baseline and present approximation method, as in Cinbis. The performance metric is the average precision (AP) per class, and the corresponding mean over the four classes (mAP). Detections are labeled as true or false positives based on the overlap with ground truth bounding boxes. The overlap measure is the size of the intersection divided by the size of the union of the bounding boxes (also called the Jaccard index). To be considered a correct detection, the overlap between the predicted bounding box and ground truth bounding box must exceed 50%. Multiple detections of the same object in an image are counted as false alarms.

1. Detection Accuracy

Table 1 provides a summary of experimental results obtained, illustrating that the exemplary method used herein using patch-based approximations of the window-level operations (referred to as "Approx L2") yield only minor drops in terms of detection accuracy (AP) when compared to the expensive but exact method of Cinbis, et al. (referred to as "Exact L2"). It should be noted that the method of the Cinbis, et al. reference does not use exactly the same steps. It uses selective search (following Uijlings, et al., "Selective search for object recognition," Intern'l J. Computer Vision, vol. 104 (2), pp. 154-171 (2013)) to produce candidate windows during a preprocessing step, while the present method uses an exhaustive sliding window search. Both methods, however, are based on the same patch-level and window-level descriptors, and are, therefore, comparable.

When not using the Spatial Pyramid (SP), the exemplary method performs on a par with the best published results of Cinbis, et al., which uses exact window-level normalization and a non-linear square-rooting transform. When using geometry via spatial pyramids, only a 4.7% drop in performance is observed with respect to the exact normalization case, and a 6.2% drop with respect to the case with square-rooting. This drop in performance when using spatial pyramids is expected, as the orthogonality assumption on the patch embeddings is less likely to hold when working with spatial pyramid cells, which are small sub-windows of the larger full candidate windows.

It may be noted that the results vary significantly across object categories: the approximations used in the exemplary method have almost no performance impact for the categories Bus and Cat, but incur a more significant drop in AP for Motorbike and Sheep.

TABLE 1

Comparison in terms of accuracy between the proposed efficient detection method, and the best published results so far, with and without spatial pyramid (SP)

| Method | Bus | Cat | Motorbike | Sheep | All |
|---|---|---|---|---|---|
| Approx L2 without Spatial Pyramid | 23 | 40 | 28 | 8 | 25 |
| Approx L2 with Spatial Pyramid | 45 | 43 | 41 | 22 | 38 |
| Exact L2 +√ without Spatial Pyramid | 22.2 | 35.8 | 26.3 | 16.6 | 25.2 |
| Exact L2 with Spatial Pyramid | — | — | — | — | 42.7 |
| Exact L2 +√ with Spatial Pyramid | 47.6 | 45.0 | 54.2 | 30.0 | 44.2 |

2. Run-Time Efficiency

Second, an evaluation of whether approximate window-level operations allow for significant time savings compared to the exact case is performed. The exact sliding window approach was implemented and its average run time per image compared to the same sliding window with the approximate normalization and pooling strategy described herein. All experiments are performed on the same core, a single Intel® Core™ i7 CPU 880 clocked at 3.07 GHz. All the common parameters are set to the same value for both the exact and approximate experiments.

As the complexity is proportional to the number of candidate window sizes and spatial pyramid cells for both approaches, timings without spatial pyramid and for a single candidate window size (the most likely a priori amongst the ones used to report the results in Table 1) are first reported. The exact sliding window method shows an average processing time of 135 s per image, whereas the present method requires only 1 s per image. The present method, therefore, allows for a significant ×135 speed-up in this case.

Second, the average detection time per image with the detection parameters used to produce the results in Table 1 were measured. This is more computationally expensive due to the use of 10 candidate window sizes, and a spatial pyramid with 17 cells. In this case, the exact sliding window processes an image in 5000 s, on average, compared to only 10 s for the present method, resulting in a ×500 speed-up. Note that in practice, the exact sliding window is generally approximated using a sliding window step size s≥2 pixels, which results in a speed-up proportional to $s^2$, whereas the results above are for the exhaustive case (s=1).

The computational cost of pre-selecting candidate windows is significantly higher in the method of Cinbis, et al. than the entire cost of the present detection approach. A 35 s per image preprocessing time was measured using the publicly available code of Uijlings, et al. The pre-processing stage of Cinbis, et al. is thus ×3.5 slower than the entire approximate sliding window detection using the most expensive settings mentioned above of the present method.

In conclusion, these results suggest that the approximations used in the present method can yield significant speed-ups for moderate to minor drops in detection performance, depending on the object category.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An object detection method comprising:
  for each of a set of patches, encoding features of each of the patch with a non-linear mapping function;
  for each patch in the set, computing first and second scalar patch statistics with non-linear operations on the encoded features for approximating a window-level non-linear operation with the patch-level non-linear operations;
  storing the computed scalar patch statistics;
  extracting windows from the image, each window comprising a sub-set of the set of patches;
  scoring each of the windows with a linear function of the stored computed scalar patch statistics of the respective sub-set of patches; and
  providing for detecting objects in the image based on the window scores,
  wherein at least one of the encoding patch features, computing patch statistics, extracting windows, scoring the windows, and detection of objects is performed with a processor.

2. The method of claim 1, wherein the encoding of features comprises:
  computing a patch descriptor for each of a set of patches of an image; and
  encoding each of the patch descriptors with a non-linear mapping function.

3. The method of claim 2, wherein the patch encoding comprises computing a likelihood that the descriptor is emitted by a generative model.

4. The method of claim 3, wherein the patch encoding comprises a Fisher Vector.

5. The method of claim 1, wherein the computing of the patch statistics includes performing a non-linear operation on each of the encoded features.

6. The method of claim 5, wherein the performing of the non-linear operation comprises computing an $l_2$-normalization of each of the encoded features.

7. The method of claim 1, wherein the computed patch statistics include:
a statistic which reflects a contribution of the patch to the score of the window for a given target class to be detected; and
a statistic which normalizes the encoded patch features.

8. The method of claim 1, wherein the computed patch statistics include:
a norm of the encoded patch features or a function thereof; and
a weighted function of the encoded patch features in which weights are weights of a linear classifier trained to score window representations.

9. An object detection method, comprising:
for each of a set of patches, encoding features of each of the patch with a non-linear mapping function;
computing patch statistics on the encoded features for approximating a window-level non-linear operation with a set of patch-level operations;
extracting windows from the image, each window comprising a sub-set of the set of patches;
scoring each of the windows based on the computed patch statistics of the respective sub-set of patches; and
providing for detecting objects in the image based on the window scores,
wherein the patch statistics are of the form:

$$\hat{\psi}(x_k) = (w^T \phi(x_k), \|\phi(x_k)\|_2^2) \qquad (7)$$

wherein w comprises a vector of weights of a classifier function for classifying a window representation with respect to a selected class;
T represents the transpose operator;
$\phi(x_k)$ represents an encoded patch descriptor which encodes the patch features with a non-linear mapping function; and
$\|\phi(x_k)\|_2^2$ represents the $l_2$-norm of the encoded patch descriptor,
wherein at least one of the encoding patch features, computing patch statistics, extracting windows, scoring the windows, and detection of objects is performed with a processor.

10. The method of claim 9, wherein the scoring each of the windows based on the respective window representation comprises computing a score $\hat{s}(\chi)$ for the window representation as a function of:

$$\frac{\sum_{i=1}^{K} w^T \varphi(x_i)}{\sqrt{\sum_{i=1}^{K} \|\varphi(x_i)\|_2^2}}$$

where K represents the set of patches in the window; and $x_i$ represents one of the K patches in the window.

11. An object detection method, comprising:
for each of a set of patches, encoding features of each of the patch with a non-linear mapping function;
computing patch statistics on the encoded features for approximating a window-level non-linear operation with a set of patch-level operations;
extracting windows from the image, each window comprising a sub-set of the set of patches;
scoring each of the windows based on the computed patch statistics of the respective sub-set of patches, wherein the scoring of each of the windows employs integral images for pooling of the weighted encoded patch features, wherein when integral images are used, the scoring of each of the windows comprises four look-up operations on an integral image H:

$$\hat{s}(\chi) = \tilde{g}(H(x_0,y_0) + H(x_1,y_1) - H(x_0,y_1) - H(x_1,y_0)) + b, \qquad (10)$$

where $\tilde{g}(u, v) = u/\sqrt{v}$, $(x_0, y_0)$ are the coordinates of the upper left corner of window $\chi$, and $(x_1, y_1)$ are the coordinates of the lower right corner of window $\chi$, and
providing for detecting objects in the image based on the window scores,
wherein at least one of the encoding patch features, computing patch statistics, extracting windows, scoring the windows, and detection of objects is performed with a processor.

12. The method of claim 11, wherein the method includes generating a data structure H that, for any location (x, y) in image $\mathcal{J}$, stores the cumulative sums of all the patch statistics $\hat{\psi}(x)$ for all the patches x above and to the left of (x, y):

$$H(x,y) = \Sigma_{x \in \mathcal{J}_{(x,y)}} \hat{\psi}(x), \qquad (9)$$

where $\mathcal{J}(x, y)$ is the restriction of $\mathcal{J}$ to the set of patches above and to the left of (x, y).

13. The method of claim 1, wherein the scoring of each of the windows employs integral images and the scoring of each of the windows comprises four look-up operations on the integral image H:

$$\hat{s}(\chi) = \tilde{g}(H(x_0,y_0) + H(x_1,y_1) - H(x_0,y_1) - H(x_1,y_0)) + b, \qquad (10)$$

where $\tilde{g}(u, v) = u/\sqrt{v}$, $(x_0, y_0)$ are the coordinates of the upper left corner of window $\chi$, and $(x_1, y_1)$ are the coordinates of the lower right corner of window $\chi$.

14. An object detection method comprising:
for each of a set of patches, encoding features of each of the patch with a non-linear mapping function;
computing patch statistics on the encoded features for approximating a window-level non-linear operation with a set of patch-level operations;
extracting windows from the image, each window comprising a sub-set of the set of patches;
scoring each of the windows based on the computed patch statistics of the respective sub-set of patches, wherein the scoring of each of the windows employs integral images or box filters for pooling of the weighted encoded patch features,
wherein when integral images are used, the method includes generating a data structure H that, for any location (x, y) in image $\mathcal{J}$, stores the cumulative sums of all the patch statistics $\hat{\psi}(x)$ for all the patches x above and to the left of (x, y):

$$H(x,y) = \Sigma_{x \in \mathcal{J}_{(x,y)}} \hat{\psi}(x), \qquad (9)$$

where $\mathcal{J}(x, y)$ is the restriction of $\mathcal{J}$ to the set of patches above and to the left of (x, y),
wherein when box filters are used, a box filter of each of the windows $\chi_n$ of size w×h in image $\mathcal{J}$ is computed using a w×h box filter F and the score of each window is of the form:

$$\hat{s}(\{\chi_n, n=1, \ldots, N\}) = \tilde{g}(F * \hat{\psi}(\mathcal{J})) + b, \qquad (12)$$

where $\tilde{g}(u,v) = u/\sqrt{v}$, and $\hat{\psi}(x_k) = (w^T \phi(x_k), \|\phi(x_k)\|_2^2)$; and
providing for detecting objects in the image based on the window scores, wherein at least one of the encoding patch features, computing patch statistics, extracting windows, scoring the windows, and detection of objects is performed with a processor.

15. The method, wherein the generating a window representation comprises generating a sub-window representation for each of a set of sub-windows of the window and aggregating representations of the sub-windows.

16. The method, wherein the windows are scored without performing any non-linear operations after extracting the windows.

17. A system including memory which stores instructions for performing the method and a processor in communication with the memory for executing the instructions.

18. A computer program product comprising non-transitory memory storing instructions which when executed by a computer, perform the method.

19. An object detection system comprising:
an embedding component comprising at least one of:
  a) a patch descriptor generator which computes patch descriptors for a set of patches of an input image and a patch embedding component which encodes each of the patch descriptors with a non-linear mapping function to generate encoded patch features, and
  b) a component which for each of a set of patches, encodes features of the patch with a non-linear mapping function to generate encoded patch features;
a patch statistics computing component which computes patch statistics on the encoded patch features for approximating a window-level non-linear operation with a set of patch-level operations and stores the patch statistics in memory;
a window extractor which extracts windows from the image, each window comprising a sub-set of the set of patches wherein the windows are scored without performing any non-linear operations after extracting the windows;
a window scoring component which scores the windows based on the stored computed patch statistics of the respective sub-set of patches; and
a detection component which detects objects in the image based on the window scores; and
a processor which implements the embedding component, patch statistics computing component, window extractor, window scoring component, and detection component.

20. The system of claim 19, further comprising a patch extractor which extracts patches of the image.

21. An object detection method comprising:
for each of a set of patches of an image, encoding a set of features extracted from the patch with a non-linear mapping function that is based on a generative model to generate encoded patch features;
precomputing patch statistics on the encoded patch features for approximating a window-level non-linear operation with a set of patch-level operations, the precomputing of the patch statistics including computing a non-linear function of the encoded patch features and a weighted function of the encoded patch features using weights of a linear classifier trained to score window representations;
extracting windows from the image, each window comprising a sub-set of the set of patches;
scoring each of the windows based on the precomputed patch statistics of the respective sub-set of patches with a pooling function that avoids performing non-linear operations in the window scoring; and
providing for detecting objects in the image based on the window scores,
wherein at least one of the encoding patch descriptors, computing patch features, extracting windows, scoring the windows, and detection of objects is performed with a processor.

* * * * *